United States Patent

Kadosawa et al.

[11] Patent Number: 5,897,647
[45] Date of Patent: Apr. 27, 1999

[54] INFORMATION PROCESSING APPARATUS AND METHOD AND COMPUTER USABLE MEDIUM FOR STORING AN INPUT CHARACTER TRAIN IN CORRESPONDENCE TO A FIGURE OBJECT TO WHICH THE CHARACTER TRAIN IS INSTRUCTED TO BE PASTED

[75] Inventors: Tsuneaki Kadosawa, Kanagawa-ken; Takashi Nakamura, Utsunomiya; Hitoshi Watanabe, Yokohama; Satoshi Asada, Inagi; Yasuyuki Ogawa, Tokyo, all of Japan

[73] Assignee: Canon Kabushiki Kaisha, Tokyo, Japan

[21] Appl. No.: 08/568,517

[22] Filed: Dec. 7, 1995

[30] Foreign Application Priority Data

Dec. 14, 1994 [JP] Japan ..................................... 6-333184

[51] Int. Cl.$^6$ .................................................. G06F 15/403
[52] U.S. Cl. ............................................................. 707/530
[58] Field of Search ..................................... 395/802, 936; 707/530; 345/326

[56] References Cited

U.S. PATENT DOCUMENTS

| 4,881,197 | 11/1989 | Fischer | 395/936 |
| 4,905,185 | 2/1990 | Sakai | 395/802 |
| 5,341,293 | 8/1994 | Vertelney et al. | 395/936 |
| 5,437,005 | 7/1995 | Torres | 395/802 |
| 5,509,116 | 4/1996 | Hiraga et al. | 707/1 |
| 5,528,739 | 6/1996 | Lucas et al. | 395/936 |

*Primary Examiner*—Mark R. Powell
*Attorney, Agent, or Firm*—Fitzpatrick, Cella, Harper & Scinto

[57] ABSTRACT

An information processing method and apparatus includes elements and steps to rapid figure editing and its execution environment by quickly executing a program and a file from a diagram showing a flow of the program and file. According to the invention, a rectangular figure object in which a line width is set to "0.2 mm", a line type is set to "solid line", and a line color is set to "black" and which is filled by a pattern of a "diagonal-1" of "red" is pasted to a drawing sheet by using a mouse or the like by the user. After a character attribute "dir" was pasted to the rectangular object by using a keyboard, for example, when an instruction to point the rectangular object by using the mouse or the like or to depress a button of the mouse while depressing a control key of the keyboard, or the like is performed, a command interpreter stored in a memory device is activated by a CPU, the character attribute "dir" of the rectangular object is read out, the characters "dir" are sent to the activated command interpreter, and the computer command "dir" is executed, so that the above object can be accomplished.

16 Claims, 3 Drawing Sheets

OBJECT NAME: RECTANGLE
LINE WIDTH: 0.2mm
LINE TYPE: SOLID LINE
LINE COLOR: BLACK
FILLER PATTERN: DIAGONAL-1
FILLER COLOR: RED
CHARACTER ATTRIBUTE: DIR

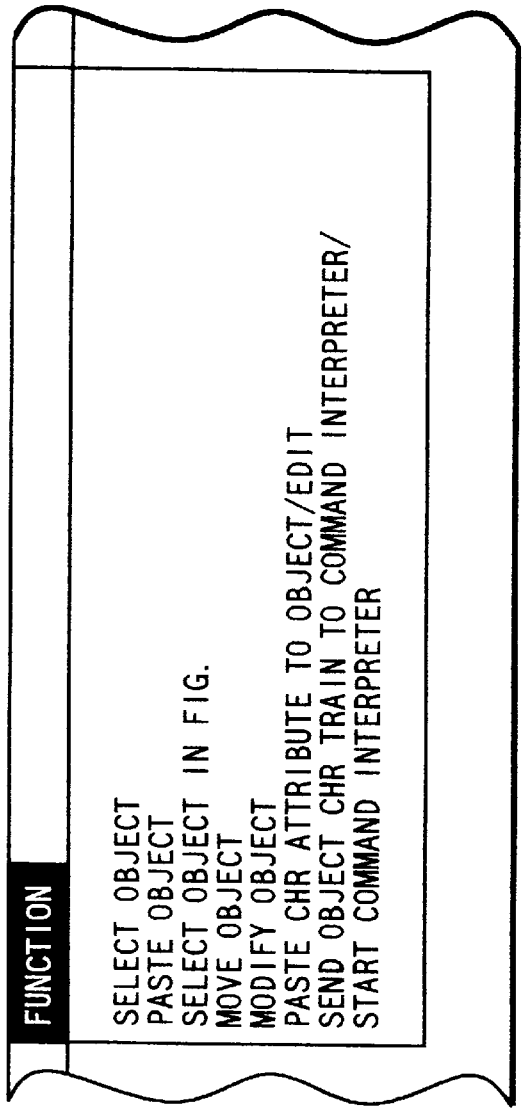

INFORMATION PROCESSING APPARATUS AND METHOD AND COMPUTER USABLE MEDIUM FOR STORING AN INPUT CHARACTER TRAIN IN CORRESPONDENCE TO A FIGURE OBJECT TO WHICH THE CHARACTER TRAIN IS INSTRUCTED TO BE PASTED

BACKGROUND OF THE INVENTION

1. Field of the Invention

The present invention relates to information processing method and apparatus in an apparatus such as personal computer, workstation, word processor, or the like having a figure editing function.

The invention also relates to information processing method and apparatus which can easily input a character string suitable for a document on the document formed by a user or can easily operate o to execute a command.

2. Related Background Art

Hitherto, an apparatus having a figure editing function can form a figure of a desired form by adding various kinds of attributes such as the width of a line, a filler pattern in an area, color, and the like, which can be used when forming a figure of a figure object to be formed and edited by the apparatus.

According to the conventional apparatus, however, the attributes which can be added to the figure object are only attributes regarding parameters when the figure is formed. Therefore, in order to add some attributes other than the figure formation parameters, for example, a character string in correspondence to the figure formed by the figure editing function, processes for inputting the character string as a character train object which is displayed together with the figure object, newly grouping, and the like are needed.

Moreover, a program name, a file name, and the like cannot be added as attributes to the figure object.

For instance, in a desk-top type computer of an OS (Operating system) of Macintosh (trade name of Apple Computer Inc. of the U.S.A.) although the program name and the file name are linked to the icons, the icon is built in the OS and can be displayed on only an icon display picture plane, so that the program name or file name cannot be handled as one data in a document.

SUMMARY OF THE INVENTION

The invention is made in consideration of the above problems in the prior art. It is an object of the invention that, for example, a character string other than figure formation parameters can be added as one of the attributes when forming a figure.

Thus, information other than the figure formation parameters can be easily added to a figure object and an editing operation can be easily performed.

Thus, information which is not needed to display as an object can be added as one of the attributes.

According to the invention, since the character string can be added as one of the attributes of the figure object as one data constructing a document, the character string which can be different for every document and is suitable for each document can be set as an attribute.

According to the invention, since the attribute of the character string can be added to each figure object in a figure comprising a plurality of figure objects formed by the user, the character string suitable for a position of each figure object in such a figure can be set.

According to the invention, since a command can be added as one of the attributes of the figure object as one data constructing the document, the character string which can be different for every document and is suitable for each document can be set as an attribute.

According to the invention, in a figure comprising a plurality of figure objects formed by the user, since the attribute of the command can be added to each figure object, the command suitable for a position of each object in such a figure can be set as an attribute.

According to the invention, the command can be added as one of the attributes to the figure object as one data constructing the document or figure object in a figure comprising a plurality of figure objects. Therefore, a selection of the figure object to which a desired command was added results in an input of the command, so that an operation and a process for purposely displaying the icon display picture plane in order to select the desired command can be made unnecessary.

Since the command as an attribute added to the figure object is valid even after the document was once stored and read out again, an inputting operation of a command suitable for the document can be always easily performed.

According to the invention, the object to which the character train as an attribute is added is not limited to the figure object but an image object or a character string object can be also used.

BRIEF DESCRIPTION OF THE DRAWINGS

FIG. 3 is a diagram for explaining a functional construction of the information processing apparatus of the embodiment;

FIG. 4 is a diagram showing an example of attributes of a character string object.

DETAILED DESCRIPTION OF THE PREFERRED EMBODIMENT

An embodiment of the invention will now be described in detail hereinbelow with reference to the drawings.

Figures 1, 2:
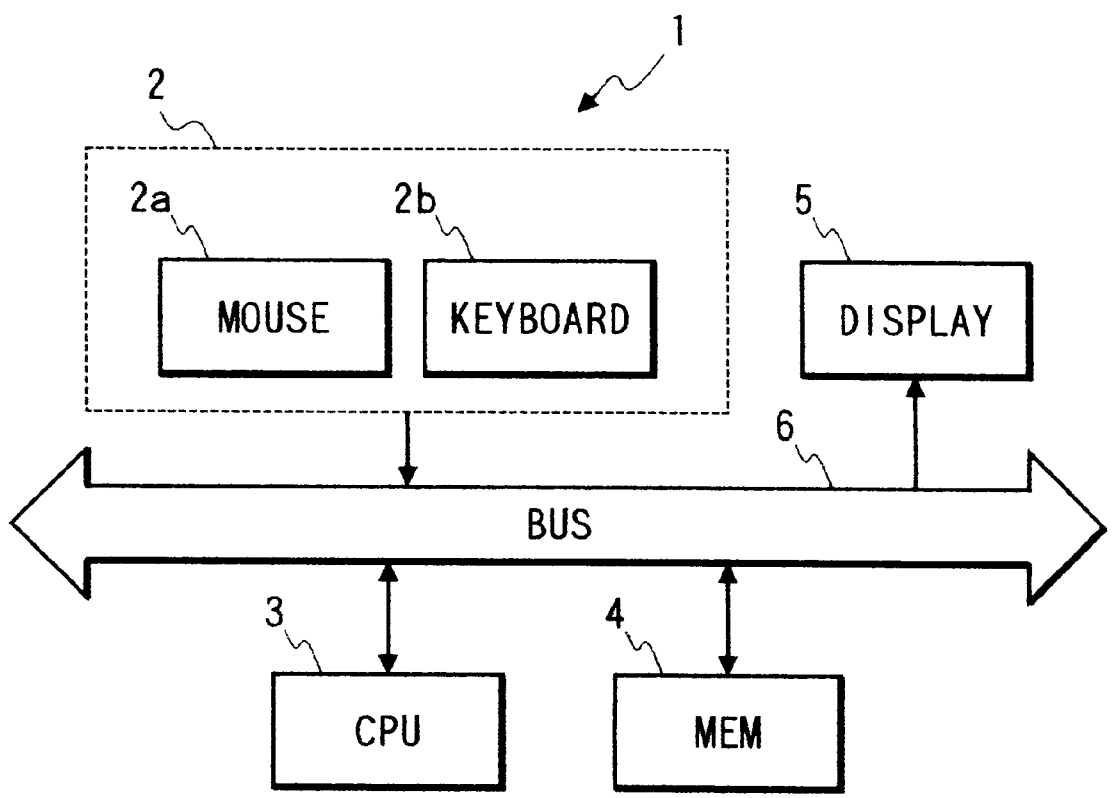
FIG. 1 is a block diagram showing a schematic construction of an information processing apparatus according to an embodiment of the invention.
FIG. 2 is a diagram showing an example of attributes of a figure object.

FIG. 1 is a block diagram showing a schematic construction of an information processing apparatus 1 according to an embodiment of the invention.

In the diagram, the information processing apparatus 1 comprises an input device 2 for inputting various information, a CPU 3 for controlling the whole information processing apparatus 1, a memory device 4 for storing a control processing program which is executed by the CPU 3, a command interpreter, various information, and the like, and a display such as CRT, LCD, or the like for displaying various information such as figure, characters, and the like. The component elements 2 to 5 are mutually connected through a bus 6 and data is transmitted and received among them. The input device 2 comprises a mouse 2a as a pointing device and a keyboard 2b as an input device.

A control process which is executed by the information processing apparatus 1 constructed as mentioned above will now be described hereinbelow with reference to FIGS. 2 and 3.

FIG. 2 is a diagram showing an example of attributes of a figure object. Every time the figure object is formed as a document on the display 5, data is formed for every object and stored into the memory device 4. FIG. 3 is a diagram for explaining a functional construction of the information processing apparatus 1.

In the information processing apparatus 1, the user pulls down a "function" menu as shown in FIG. 3 by using the mouse 2a, selects "paste object" in the menu, selects the rectangular figure object in which a line width is set to "0.2 mm", a line type is set to "solid line", and a line color is set to "black" and which is filled by a pattern of "diagonal-1" of "red", as shown in, for example, FIG. 2, and pastes the figure object to a drawing sheet. The data of the object is stored by making it correspond to position information on the drawing sheet at a time point when the figure object is pasted to the drawing sheet or the figure object is formed on the drawing sheet. The data is used to judge which object is displayed at the position designated by the mouse 2a or the like.

The position information is updated every time a change of the position of the object is instructed.

Subsequently, the user selects "paste chr attribute to object/edit" from the menu by using the mouse 2a and pastes a character attribute "dir" to the rectangular object specified at that time by using the keyboard 2b. The character string instructed to be pasted is stored into the memory device 4 as a character attribute of the specified object.

When the user points and specifies the rectangular object by the mouse 2a, and for example, instructs it to select "send object chr string to command interpreter/start command interpreter" from the menu or to depress a button of the mouse 2a while depressing a control key of the keyboard 2b, or the like, the CPU 3 starts the command interpreter stored in the memory device 5. The CPU 3 judges that the object specified at that time is the rectangular object in accordance with a document name opened at that time and the pointed position information, reads out the character attribute "dir" of the rectangular object from the memory device 4, sends the characters "dir" to the started command interpreter, and executes a computer command "dir".

As described above, according to the embodiment, the attribute ("dir") other than the attributes regarding the figure is added to the figure objects formed in the document and the attribute of the object designated on the document is read out and sent to the command interpreter. Therefore, the computer command can be rapidly executed from the figure object in the document and a quick figure edition and its execution environment can be provided.

In the embodiment, although the figure object has been used as an object which is handled by the information processing apparatus 1, the invention is not limited to the figure object, but a character string object as shown in FIG. 4 or an image object which is optically read out by a scanner or the like can be also used. Namely, by processes similar to the control processes of the above-mentioned embodiment, figure information such as character type, size, and the like, is eliminated from the character string object and only the character string data is sent to the command interpreter, which is started by the CPU 3 and can be executed as a command.

The figure object, the character string object, and the image object are not individually processed but the figure object, the character string object, and the image object are grouped in accordance with a desired selected combination. In the case where there is a character string as an attribute in the grouped objects, it is also possible that the character string is sent to the command interpreter and is executed as a command.

In the embodiment, although "dir" as a computer command has been transmitted to the command interpreter as an attribute that is added to the figure object and the character string object, so long as it is a command that can be recognized by the command interpreter, any command can be also used. A destination to which the attribute is sent is not limited to the command interpreter.

In the embodiment, further, the mouse is used as a pointing device and the keyboard is used as an input device. However, there is no need to limit to them and any device can be also used so long as it can perform a similar operation.

Figure 5:
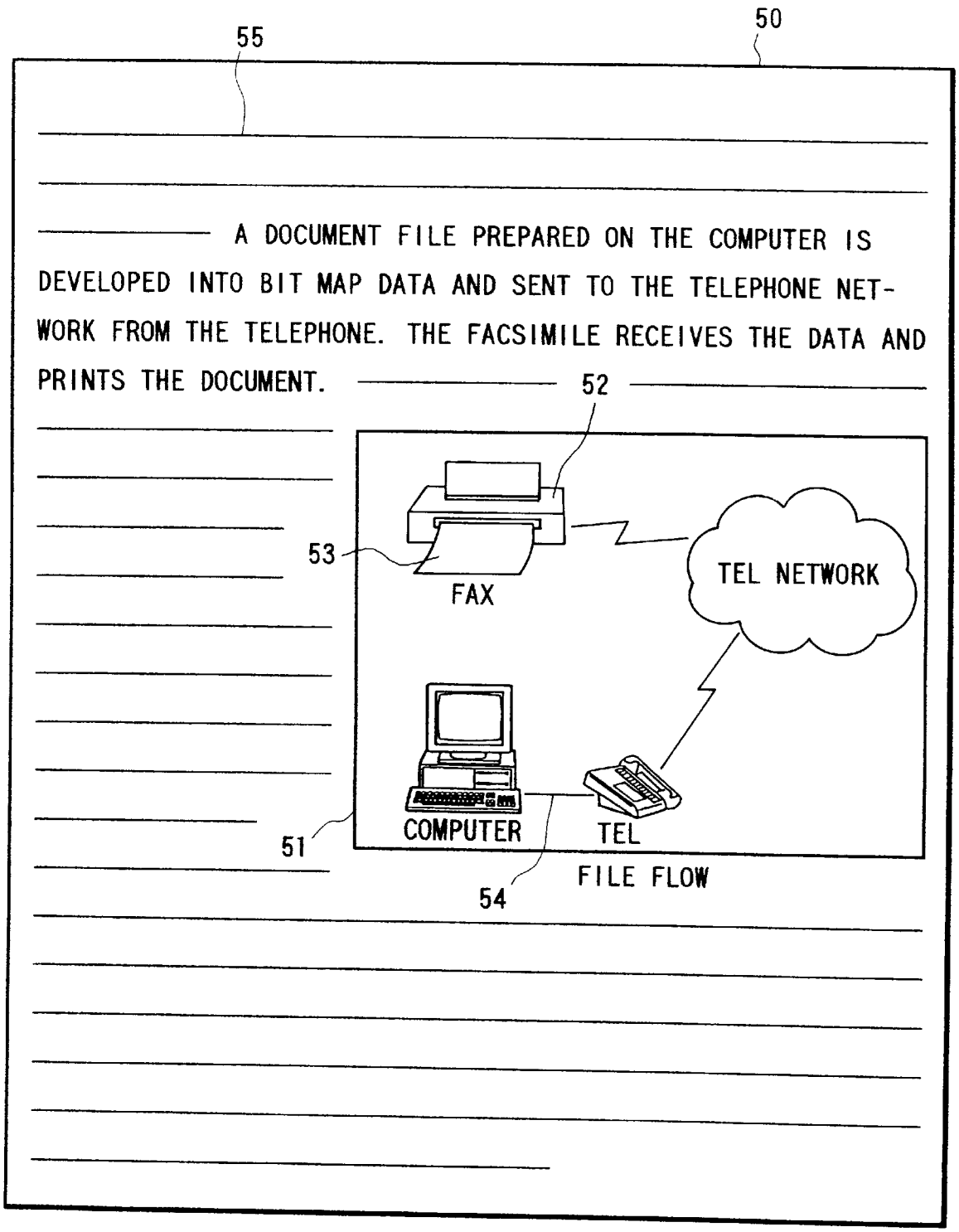
FIG. 5 is a diagram showing an example of a document including the figure object.

FIG. 5 shows an example of a document. The embodiment will now be specifically described in accordance with FIG. 5.

Document data 50 includes a document 55 and a figure 51. The figure 51 is constructed by a plurality of figure objects (52 to 54, and others).

"Name of program for developing document file into bit map data" is registered as a character train attribute into the object 54 as a line which connects, for example, a personal computer and a telephone. "Directory of file received by fax" is registered as a character string attribute into the object 52 in which a facsimile main body is drawn. "File name" is registered as a character string attribute into the object 53 in which a sheet outputted from the facsimile is drawn.

When each object is specified while instructing the function such as "Send object character string to command interpreter" on the document data 50, in the case where the object 54 is specified, a program to develop the document file into bit map data is executed. When the object 52 is specified, a file received by the facsimile is retrieved and its directory is displayed. In the case where the object 53 is specified, a file itself which is closely related to the document 52 is accessed and displayed.

As mentioned above, the file name, the program name, the command, and the like the which are concerned with an intention when the figure 51 is formed or which are closely related to the document, are registered as character string attributes into data in the document and can be accessed any time. Therefore, the operation and processes can be rapidly executed.

What is claimed is:

1. An information processing method comprising the steps of:

selecting a figure object which can be drawn in a document by setting a desired parameter representing figure attributes by the operator;

inputting a character string representing a command;

instructing the input character string to be pasted on the selected figure object; and storing the input character string in correspondence to the figure object to which the character string is instructed to be pasted, the character string being stored as a command which is to be read in response to designation of the figure object in the document.

2. An information processing method comprising the steps of:

selecting a character object which can be drawn in a document by setting a desired parameter representing figure attributes by the operator:

inputting a character string representing a command:

instructing the input character string to be pasted on the selected character object; and storing the input character string in correspondence to the character object to which the character string is instructed to be pasted, the character string being stored as a command which is to be read in response to designation of the character object in the document.

3. An information processing method comprising the steps of:

selecting an image object which can be drawn in a document by setting a desired parameter representing figure attributes by the operator:

inputting a character string representing a command;

instructing the input character string to be pasted on the selected image object; and storing the input character string in correspondence to the image object to which the character string is instructed to be pasted, the character string being stored as a command which is to be read in response to designation of the image object in the document.

4. A method according to claim 1, wherein said storing step stores the input character string as a character attribute of the figure object.

5. A method according to claim 1, further comprising the step of processing a command represented by the read character string based on a processing designated at the same time when the figure object is designated.

6. An information processing apparatus comprising:

selecting a figure object which can be drawn in a document by setting a desired parameter representing figure attributes by the operator;

inputting means for inputting a character string representing a command;

instructing means for instructing the input character string to be pasted on the selected figure object; and storing means for storing the input character string in correspondence to the figure object to which the character string is instructed to be pasted, the character string being stored as a command which is to be read in response to designation of the figure object in the document.

7. An information processing apparatus comprising:

selecting a character object which can be drawn in a document by setting a desired parameter representing figure attributes by the operator;

inputting means for inputting a character string representing a command;

instructing means for instructing the input character string to be pasted on the selected character object; and storing means for storing the input character string in correspondence to the character object to which the character string is instructed to be pasted, the character string being stored as a command which is to be read in response to designation of the character object in the document.

8. An information processing apparatus comprising:

selecting an image object which can be drawn in a document by setting a desired parameter representing figure attributes by the operator;

inputting means for inputting a character string representing a command;

instructing means for instructing the input character string to be pasted on the selected image object; and storing means for storing the input character string in correspondence to the image object to which the character string is instructed to be pasted the character string being stored as a command which is to be read in response to designation of the image object in the document.

9. An apparatus according to claim 6, wherein said storing means stores the input character string as a character attribute of the figure object.

10. An apparatus according to claim 6, wherein the figure object is defined by an attribute which represents a characteristic of a figure, as well as the character attribute.

11. An apparatus according to claim 6, further comprising processing means for processing a command represented by the read character string based on a processing designated at the same time when the figure object is designated.

12. A computer usable medium having computer readable program code means embodied therein for causing a computer to process information, the computer readable program code means comprising:

first computer readable program code means for causing the computer to select a figure object which can be drawn in a document by setting a desired parameter representing figure attributes by the operator;

second computer readable program code means for causing the computer to input a character string representing a command;

third computer readable program code means for causing the computer to instruct the input character string to be pasted on the selected figure object; and fourth computer readable program code means for causing the computer to store the input character string in correspondence to the figure object to which the character string is instructed to be pasted, the character string being stored as a command which is to be read in response to designation of the figure object in the document.

13. A computer usable medium having computer readable program code means embodied therein for causing a computer to process information, the computer readable program code means comprising:

first computer readable program code means for causing the computer to select a figure object which can be drawn in a document by setting a desired parameter representing figure attributes by the operator;

second computer readable program code means for causing the computer to input a character string representing a command:

third computer readable program code means for causing the computer to instruct the input character string to be pasted on the selected character object; and fourth computer readable program code means for causing the computer to store the input character string in correspondence to the character object to which the character string is instructed to be pasted, the character string being stored as a command which is to be read in response to designation of the character object in the document.

14. A computer usable medium having computer readable program code means embodied therein for causing a computer to process information, the computer readable program code means comprising:

first computer readable program code means for causing the computer to select a figure object which can be drawn in a document by setting a desired parameter representing figure attributes by the operator;

second computer readable program code means for causing the computer to input a character string representing a command;

third computer readable program code means for causing the computer to instruct the input character string to be pasted on the selected image object; and fourth computer readable program code means for causing the computer to store the input character string in correspondence to the image object to which the character string is instructed to be pasted, the character string being stored as a command which is to be read in response to designation of the image object in the document.

15. A medium according to claim 12, wherein said fourth computer readable program code means instructs the computer to store the input character string as a character attribute of the figure object.

16. A medium according to claim 12, further comprising fifth computer readable program code means for causing the computer to process a command represented by the read character string based on a processing designated at the same time when the figure object is designated.

* * * * *

UNITED STATES PATENT AND TRADEMARK OFFICE
CERTIFICATE OF CORRECTION

PATENT NO. : 5,897,647

DATED : April 27, 1999

INVENTOR(S) : TSUNEAKI KADOSAWA, ET AL.

It is certified that error appears in the above-identified patent and that said Letters Patent is hereby corrected as shown below:

<u>COLUMN 1</u>

Line 18, "o to" should read --to--.

<u>COLUMN 4</u>

Line 10, "to" (2nd occurrence) should be deleted.
    Line 38, "the" (2nd occurrence) should read --,--.

<u>COLUMN 5</u>

Line 67, "pasted the" should read --pasted, the--.

Signed and Sealed this

Sixth Day of June, 2000

Attest:

Q. TODD DICKINSON

*Attesting Officer*    *Director of Patents and Trademarks*